(12) United States Patent
Olkis et al.

(10) Patent No.: US 12,549,009 B2
(45) Date of Patent: Feb. 10, 2026

(54) ENERGY MANAGEMENT SYSTEM FOR A BUILDING AND METHOD OF USING THE ENERGY MANAGEMENT SYSTEM

(71) Applicant: Mitsubishi Electric Corporation, Tokyo (JP)

(72) Inventors: Christopher Olkis, Livingston (GB); James Freeman, Livingston (GB); Georgeanna Kawaley, Livingston (GB)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 491 days.

(21) Appl. No.: 18/124,597

(22) Filed: Mar. 22, 2023

(65) Prior Publication Data
US 2023/0318296 A1 Oct. 5, 2023

(30) Foreign Application Priority Data
Mar. 29, 2022 (EP) .................................... 22165092

(51) Int. Cl.
*H02J 3/14* (2006.01)
*H02J 3/38* (2006.01)

(52) U.S. Cl.
CPC .............. *H02J 3/144* (2020.01); *H02J 3/381* (2013.01); *H02J 2300/20* (2020.01)

(58) Field of Classification Search
CPC .. F24H 15/16; F24H 2240/01; F24H 2240/09; G06Q 50/06; G06Q 50/163;
(Continued)

(56) References Cited

U.S. PATENT DOCUMENTS

2014/0102662 A1 4/2014 Grama et al.
2016/0344204 A1* 11/2016 Steffes ...................... H02J 3/28
(Continued)

FOREIGN PATENT DOCUMENTS

AU 2018202778 B2 5/2018
EP 2482021 A2 8/2012
(Continued)

*Primary Examiner* — Mohammad Ali
*Assistant Examiner* — Dhruvkumar Patel
(74) *Attorney, Agent, or Firm* — XSENSUS LLP (57) ABSTRACT

The present invention relates to an energy management system for a building, comprising at least one heat pump, at least one first thermal energy storage device for providing domestic hot water, at least one second thermal energy storage device for providing space heating, at least one renewable energy generation device, at least one first state of charge analyser for determining the state of charge of the at least one first thermal energy storage device, at least one second state of charge analyser for determining the state of charge of the at least one second thermal energy storage device, and a controller configured to control the at least one heat pump, the at least one first thermal energy storage device, the at least one second thermal energy storage device, and the at least one renewable energy generation device. The controller is configured to control, in dependence on at least the state of charge of the at least one first thermal energy storage device and/or the state of charge of the at least one second thermal energy storage device, whether one of and which of the at least one first thermal energy storage device and the at least one second thermal energy storage device is charged with energy provided by (a heat pump operation of) the at least one heat pump and/or energy provided by the at least one renewable energy generation device. Furthermore, the present invention relates to a method of using the energy management system.

14 Claims, 5 Drawing Sheets

(58) Field of Classification Search
CPC .............. F24D 2200/02; F24D 2200/12; F24D 2200/14; F24D 2200/15; F24D 19/1078; F24D 19/1072; F28D 20/02
See application file for complete search history.

(56) References Cited

U.S. PATENT DOCUMENTS

2019/0137190 A1* 5/2019 Novoselac .............. F28D 20/02
2021/0325069 A1* 10/2021 Cotton .................. F24F 5/0021

FOREIGN PATENT DOCUMENTS

| EP | 3336473 A1 | 6/2018 | | |
|----|------------|--------|---|---|
| WO | WO-2017103955 A1 | * | 6/2017 | ................ H02J 3/00 |
| WO | WO-2018122392 A1 | * | 7/2018 | ............. G06Q 10/04 |

* cited by examiner

ENERGY MANAGEMENT SYSTEM FOR A BUILDING AND METHOD OF USING THE ENERGY MANAGEMENT SYSTEM

CROSS-REFERENCE TO RELATED APPLICATION

The present application claims priority to European Patent Application No. 22165092.2, filed Mar. 29, 2022, the entire contents of which are incorporated herein by reference.

The present invention relates to an energy management system for a building, comprising at least one heat pump, at least one first thermal energy storage device for providing domestic hot water, at least one second thermal energy storage device for providing space heating, at least one renewable energy generation device, at least one first state of charge analyser for determining the state of charge of the at least one first thermal energy storage device, at least one second state of charge analyser for determining the state of charge of the at least one second thermal energy storage device, and a controller configured to control the at least one heat pump, the at least one first thermal energy storage device, the at least one second thermal energy storage device, and the at least one renewable energy generation device. The controller is configured to control, in dependence on at least the state of charge of the at least one first thermal energy storage device and/or the state of charge of the at least one second thermal energy storage device, whether one of and which of the at least one first thermal energy storage device and the at least one second thermal energy storage device is charged with energy provided by (a heat pump operation of) the at least one heat pump and/or energy provided by the at least one renewable energy generation device. Furthermore, the present invention relates to a method of using the energy management system.

In order to reach the net zero target for residential buildings, on-site renewables generation, e.g. photovoltaics (PV), is essential. Their on-site implementation takes pressure from the national electricity grid. However, PV generation from solar irradiance is intermittent and often heat demand is reduced during hours of high solar irradiance. Hence, PV energy needs to be stored in an energy storage device. Intelligent control systems are needed to use renewables and energy storage in the most efficient way.

Products according to the state of the art usually do not integrate advanced heat storage. Instead, they integrate appliances, domestic hot water (DHW) tanks and electric batteries. Hence, the focus of systems according to the state of the art is on electric energy management. However, thermal energy demand is exceeding electric energy demand by far in a residential building.

In an energy management system of a building that has an energy storage and a renewable energy generation device, it can be possible to charge the energy storage with energy provided by the renewable energy generation device. However, there is often the problem that the energy storage runs out of energy in times in which no renewable energy can be provided by the renewable energy generation device so that the then existing lack of energy must be compensated with energy from an electricity grid. Such dependency of an electricity grid often leads to disadvantages e.g. due to high prices for electric energy provided by the electricity grid.

Starting from this, it was the object of the present invention to provide an energy management system for a building with which it is possible to increase self-sufficiency and reduce electricity grid interaction.

In accordance with the present invention, an energy management system for a building is provided. The energy management system comprises at least one heat pump, at least one first thermal energy storage device for providing domestic hot water, at least one second thermal energy storage device for providing (heat for) space heating, at least one renewable energy generation device (or renewable energy collection device), at least one first state of charge analyser for determining the (or a) state of charge (SOC) of the at least one first thermal energy storage device, at least one second state of charge analyser for determining the (or a) state of charge (SOC) of the at least one second thermal energy storage device, and a controller configured to control (at least) the at least one heat pump, the at least one first thermal energy storage device, the at least one second thermal energy storage device, and the at least one renewable energy generation device.

The controller is configured to control (and/or decide), in dependence on (at least) the state of charge of the at least one first thermal energy storage device (determined by the at least one first state of charge analyser) and/or the state of charge of the at least one second thermal energy storage device (determined by the at least one second state of charge analyser) (and optionally also in dependence of at least one further parameter), whether one of and which one of the at least one first thermal energy storage device and the at least one second thermal energy storage device is (or is to be) charged with energy provided by (a heat pump operation of) the at least one heat pump and/or energy provided by the at least one renewable energy generation device.

The invention improves self-sufficiency and self-consumption of the building by integrating different devices through a (single) controller. The different devices include at least one heat pump, at least one first thermal energy storage device for providing domestic hot water, at least one second thermal energy storage device for providing space heating, at least one renewable energy generation device, at least one first state of charge analyser for determining the state of charge of the at least one first thermal energy storage device, and at least one second state of charge analyser for determining the state of charge of the at least one second thermal energy storage device, which can be directly or indirectly connected with each other. The controller's logic can implement different features to improve the self-consumption of renewable electricity generated onsite. With this control, it can be made possible to shift as much of the heat pump system operation into times, when renewable energy is available.

Due to the presence of the at least one first state of charge analyser and the at least one second state of charge analyser, the state of charge of the at least one first thermal energy storage device and the state of charge of the at least one second thermal energy storage device can be easily determined.

The state of charge of the at least one first thermal energy storage device determined by the at least one first state of charge analyser and/or the state of charge of the at least one second thermal energy storage device determined by the at least one second state of charge analyser can be used by the controller for controlling one or more elements of the energy management system.

The charging of the at least one first thermal energy storage device and the at least one second thermal energy storage device can be controlled by the controller. In detail, the controller uses the state of charge of the at least one first thermal energy storage device and/or the state of charge of the at least one second thermal energy storage device (and optionally also at least one further parameter) to decide whether one of the at least one first thermal energy storage device and the at least one second thermal energy storage device should be charged and to decide which one of the at least one first thermal energy storage device and the at least one second thermal energy storage device should be charged. In other words, the controller prioritizes which thermal energy storage device is charged by the at least one heat pump and/or the at least one renewable energy generation device according to the state of charge of the at least one first thermal energy storage device and/or the state of charge of the at least one second thermal energy storage device. Preferably, the controller prioritizes which thermal energy storage device is charged by the at least one heat pump and/or the at least one renewable energy generation device according to the state of charge of the at least one first thermal energy storage device, the state of charge of the at least one second thermal energy storage device, the availability of renewable energy (that can be) provided by the at least one renewable energy generation device, and optionally one or more further defined parameters.

The present invention primarily focuses on thermal energy management. Thermal energy demand is exceeding electric energy demand by far. Hence, the present invention can shift thermal energy demand to decouple it from renewables generation leading to increased energy autarky of residential buildings.

Since the decision whether one and which one of the thermal energy storage devices is charged, is made dependent on the state of charge of the at least one first thermal energy storage device and/or the state of charge of the at least one second thermal energy storage device, an unnecessary charging in undesired times for charging (e.g. times in which no renewable energy is available) can be reduced or avoided. Furthermore, it can be supported that the thermal energy storage devices keep a minimum amount of energy that can be used in times in which no renewable energy or other inexpensive energy from an external source is available. Thus, it is possible to shift thermal energy demand into desired times, e.g. into times in which renewable energy is available and thus to maximise the proportion of renewable energy used. Hence, self-sufficiency can be increased and electricity grid interaction can be reduced.

A renewable energy generation device can be understood as a device that generates or collects (renewable) energy (e.g. solar energy, wind energy, and/or water energy) from renewable sources, such as solar radiation, wind, and/or water.

The at least one renewable energy generation device can provide energy which can be used e.g. by the at least one heat pump, for charging the at least one first thermal energy storage device, for charging the at least one second thermal energy storage device, and/or for charging at least one electrical energy storage device.

The at least one heat pump can provide energy which can be used e.g. for charging the at least one first thermal energy storage device, for charging the at least one second thermal energy storage device, for charging at least one electrical energy storage device, and/or by at least one space heating device for heating at least one space comprised by the building. The at least one heat pump can use (renewable) energy provided by the at least one renewable energy generation device. If the energy management system comprises at least one electrical energy storage device, the at least one heat pump can preferably also use energy provided by the at least one electrical energy storage device. If the energy management system is connected with an electricity grid (e.g. a national electricity grid and/or a local area micro-grid), the at least one heat pump can also use energy provided by the electricity grid.

The at least one first thermal energy storage device is an at least one thermal energy storage device for providing domestic hot water. The at least one first thermal energy storage device can provide (thermal) energy which can be used e.g. by domestic hot water devices (e.g. bathtub, sink, appliances). The domestic hot water devices can be comprised by the energy management system.

The at least one second thermal energy storage device is an at least one thermal energy storage device for providing (heat for) space heating. The at least one second thermal energy storage device can provide (thermal) energy which can be used e.g. by at least one space heating device for heating at least one space comprised by the building. The at least one space heating device can be comprised by the energy management system.

A state of charge analyser is a device with which a state of charge (SOC) of a thermal energy storage device can be analysed and/or determined.

Generally speaking, the state-of-charge, SOC, of a thermal energy storage device may refer to a level of energy stored in said thermal energy storage device relative to a given upper and a given lower energy limit. The upper limit can be determined by a calibration of the thermal energy storage, e.g. enthalpy-based calibration. The state-of-charge thus can indicate a remaining energy storage level of the storage device. More generally speaking, the state-of-charge relates to the energy available in the thermal energy storage device.

The state-of-charge of a sensible heat energy storage system can be determined by the temperature and the specific heat capacity of the storage fluid used. The state-of-charge of a latent heat storage can be determined or obtained in various ways, e.g. by measuring the gas expansion inside a sealed PCM tank (as described e.g. in EP 2 482 021 A2), from power sensors through an enthalpy analysis (as described e.g. in AU 2018 202 778 B2), from a single temperature sensor placed at the bottom of the fluid container of the battery (as described e.g. in US 2014/102 662 A1), by at least two temperature sensors that are placed on a PCM tank surface (as described e.g. in EP 3 336 473 A1), or by a single temperature sensor that can be used to enable a modelbased state-of-charge prediction of a latent heat thermal energy storage device (as described e.g. in WO 2018/122392 A1).

Preferably, the energy management system comprises at least one state of charge analyser for each thermal energy storage device.

The energy management system can be connected to an electricity grid (e.g. a national electricity grid and/or a local area micro-grid) or cannot be connected to an electricity grid (e.g. a national electricity grid and/or a local area micro-grid). If the energy management system is connected to an electricity grid, the at least one heat pump can use energy provided by the electricity grid, i.e. the electricity grid can be an energy source for the at least one heat pump (in addition to other energy sources such as the at least one renewable energy generation device and—if present—the at least one electrical storage device).

A preferred embodiment of the energy management system according to the present invention is characterized in that the energy management system further comprises at least one electrical energy storage device, wherein preferably the controller is configured to control the at least one electrical energy storage device.

A further preferred embodiment of the energy management system according to the present invention is characterized in that the controller is configured to control the at least one heat pump, the at least one thermal energy storage device, and the at least one renewable energy generation device in dependence on the state of charge of the at least one first thermal energy storage device and/or the state of charge of the at least one second thermal energy storage device, and also in dependence on at least one (parameter) selected from the group consisting of the availability of renewable energy (that can be) provided by the at least one renewable energy generation device, time-of-use electricity tariff information; weather data, preferably forecast weather data, live weather data; domestic hot water demand, preferably immediate domestic hot water demand; temperature of one or more spaces to be heated; heat pump status; thermal model of the building; solar model; heat pump model; thermal energy storage model; user settings, preferably thermostat setpoints, thresholds, e.g. thermostat thresholds, set temperatures including boost temperatures, energy settings, e.g. thermostat energy settings; and combinations thereof.

A further preferred embodiment of the energy management system according to the present invention is characterized in that the controller is configured to control, in dependence on the state of charge of the at least one first thermal energy storage device and/or the state of charge of the at least one second thermal energy storage device, and also in dependence on at least one (parameter) selected from the group consisting of availability of renewable energy (that can be) provided by the at least one renewable energy generation device; time-of-use electricity tariff information; weather data, preferably forecast weather data, live weather data; domestic hot water demand, preferably immediate domestic hot water demand; temperature of one or more spaces to be heated; heat pump status; thermal model of the building; solar model; heat pump model; thermal energy storage model; user settings, preferably thermostat setpoints, thresholds, e.g. thermostat thresholds, set temperatures including boost temperatures, energy settings, e.g. thermostat energy settings; and combinations thereof, whether one of and which of the at least one first thermal energy storage device and the at least one second thermal energy storage device is charged with energy provided by (a heat pump operation of) the at least one heat pump and/or energy provided by the at least one renewable energy generation device.

A further preferred embodiment of the energy management system according to the present invention is characterized in that the controller is configured to control, in dependence on the state of charge of the at least one first thermal energy storage device and/or the state of charge of the at least one second thermal energy storage device, and also in dependence on the availability of renewable energy (that can be) provided by the at least one renewable energy generation device and optionally in dependence on at least one further parameter, whether one of and which of the at least one first thermal energy storage device and the at least one second thermal energy storage device is charged with energy provided by (a heat pump operation of) the at least one heat pump and/or energy provided by the at least one renewable energy generation device. The at least one further parameter is preferably selected from the group consisting of time-of-use electricity tariff information; weather data, preferably forecast weather data, live weather data; domestic hot water demand, preferably immediate domestic hot water demand; temperature of one or more spaces to be heated; heat pump status; thermal model of the building; solar model; heat pump model; thermal energy storage model; user settings, preferably thermostat setpoints, thresholds, e.g. thermostat thresholds, set temperatures including boost temperatures, energy settings, e.g. thermostat energy settings; and combinations thereof.

A further preferred embodiment of the energy management system according to the present invention is characterized in that the controller is configured to control, in dependence on (at least) the state of charge of the at least one first thermal energy storage device, the state of charge of the at least one second thermal energy storage device, and the availability of renewable energy (that can be) provided by the at least one renewable energy generation device, whether one of and which of the at least one first thermal energy storage device and the at least one second thermal energy storage device is charged with energy provided by (a heat pump operation of) the at least one heat pump and/or energy provided by the at least one renewable energy generation device.

A further preferred embodiment of the energy management system according to the present invention is characterized in that the at least one renewable energy generation device is selected from the group consisting of solar generation devices, preferably photovoltaic devices, in particular photovoltaic cells, photovoltaic modules; wind turbines; water turbines; and combinations thereof.

A further preferred embodiment of the energy management system according to the present invention is characterized in that
    the at least one first thermal energy storage device for providing domestic hot water is selected from the group consisting of phase-change material storage devices, preferably phase-change material storage devices with a melting point of 40° C. to 70° C.; hot water tanks; and combinations thereof, and/or
    the at least one second thermal energy storage device for providing space heating is selected from the group consisting of phase-change material storage devices, preferably phase-change material storage devices with a melting point of 30° C. to 55° C.; buffer tanks, and combinations thereof.

The at least one first thermal energy storage device and the at least one second thermal energy storage device can be present in form of a combined thermal energy storage device for providing domestic hot water and for providing space heating. The combined thermal energy storage device for providing domestic hot water and for providing space heating is preferably selected from the group consisting of phase-change material storage devices, hot water tanks, buffer tanks, and combinations thereof.

In addition to the at least one first thermal energy storage device and the at least one second thermal energy storage device, the energy management system can comprise at least one combined thermal energy storage device for providing domestic hot water and for providing space heating. The combined thermal energy storage device for providing domestic hot water and for providing space heating is preferably selected from the group consisting of phase-change material storage devices, hot water tanks, buffer tanks, and combinations thereof.

A further preferred embodiment of the energy management system according to the present invention is characterized in that the controller is configured such that, when the state of charge of the at least one first thermal energy storage device is below a predefined first (thermal energy storage device) minimum lower limit state of charge threshold ($LL_{min,DHW}$), the controller starts or maintains a first charging operation in which energy provided by (a heat pump operation of) the at least one heat pump and/or energy provided by the at least one renewable energy generation device is used only for charging the at least one first thermal energy storage device.

The predefined first minimum lower limit state of charge threshold can also be designated as predefined first thermal energy storage device minimum lower limit state of charge threshold or as predefined minimum lower limit state of charge threshold for the first thermal energy storage device.

Preferably, the at least one first thermal energy storage device and/or the at least one second thermal energy storage device can be charged by an additional booster heater or an internal resistance heater within the thermal energy storage device (by using energy provided by the at least one renewable energy generation device). This could be useful, for example, when there is a lot of renewable energy available, the heat pump is already charging the at least one first thermal energy storage device, but there would be excess renewable energy available which could be used to charge the at least one second thermal energy storage device. This would be preferable over exporting the excess renewable energy to the grid.

A further preferred embodiment of the energy management system according to the present invention is characterized in that the controller is configured such that, when the state of charge of the at least one first thermal energy storage device is at or above a predefined first (thermal energy storage device) minimum lower limit state of charge threshold ($LL_{min,DHW}$) and (at the same time) the state of charge of the at least one second thermal energy storage device is below a predefined second (thermal energy storage device) minimum lower limit state of charge threshold ($LL_{min,SH}$), the controller starts or maintains a second charging operation in which energy provided by (a heat pump operation of) the at least one heat pump and/or energy provided by the at least one renewable energy generation device is used (at least) for charging the second thermal energy storage device, but preferably only in the case that no energy provided by (a heat pump operation of) the at least one heat pump is used for heating at least one space of the building (at the same time).

A further preferred embodiment of the energy management system according to the present invention is characterized in that the controller is configured such that, when the state of charge of the at least one first thermal energy storage device is at or above the predefined first (thermal energy storage device) minimum lower limit state of charge threshold ($LL_{min,DHW}$), the controller controls, in dependence from at least one (parameter) selected from the group consisting of the state of charge of the at least one first thermal energy storage device, the state of charge of the at least one second thermal energy storage device, the operation status of the first charging operation, the operation status of the second charging operation, the operation status of the at least one heat pump, the availability of renewable energy (that can be) provided by the at least one renewable energy generation device, the presence of a proactive period in which charging of the at least one thermal energy storage device should be carried out preferentially, and combinations thereof, whether one of and which of the at least one first thermal energy storage device and the at least one second thermal energy storage device is charged with energy provided by (a heat pump operation of) the at least one heat pump and/or energy provided by the at least one renewable energy generation device.

A further preferred embodiment of the energy management system according to the present invention is characterized in that the controller is configured such that, when the state of charge of the at least one first thermal energy storage device is at or above the predefined first (thermal energy storage device) minimum lower limit state of charge threshold ($LL_{min,DHW}$), but preferably below a predefined first (thermal energy storage device) booster lower limit state of charge threshold ($LL_{boost,DHW}$), the controller starts the first charging operation only in the case that renewable energy (that can be) provided by the at least one renewable energy generation device is available and/or in the case that there is currently a predefined proactive period in which charging of the at least one thermal energy storage device should be carried out preferentially.

For example, the proactive period can be defined by a user and/or in dependence on one or more specific parameters, such as electricity tariff and/or energy demand predictions. This applies to any proactive period mentioned in this application.

The predefined first booster lower limit state of charge threshold can also be designated as predefined first thermal energy storage device booster lower limit state of charge threshold or as predefined booster lower limit state of charge threshold for the first thermal energy storage device.

A further preferred embodiment of the energy management system according to the present invention is characterized in that the controller is configured such that, when the state of charge of the at least one first thermal energy storage device is at or below a predefined first (thermal energy storage device) booster lower limit state of charge threshold ($LL_{boost,DHW}$), the controller starts the first charging operation only in the case that renewable energy (that can be) provided by the at least one renewable energy generation device is available and/or in the case that there is currently a predefined proactive period in which charging of the at least one thermal energy storage device should be carried out preferentially.

A further preferred embodiment of the energy management system according to the present invention is characterized in that the controller is configured such that, when the state of charge of the at least one second thermal energy storage device is at or above a predefined second (thermal energy storage device) minimum lower limit state of charge threshold ($LL_{min,SH}$), but preferably below a predefined second (thermal energy storage device) booster lower limit state of charge threshold ($LL_{boost,SH}$), the controller starts a second charging operation, in which energy provided by the at least one heat pump and/or energy provided by the at least one renewable energy generation device is used at least for charging the second thermal energy storage device, only in the case that renewable energy (that can be) provided by the at least one renewable energy generation device is available and/or there is currently a predefined proactive period in which charging of the at least one thermal energy storage device should be carried out preferentially.

The predefined second minimum lower limit state of charge threshold can also be designated as predefined second thermal energy storage device minimum lower limit state of charge threshold or as predefined minimum lower limit state of charge threshold for the second thermal energy storage device.

The predefined second booster lower limit state of charge threshold can also be designated as predefined second thermal energy storage device booster lower limit state of charge threshold or as predefined booster lower limit state of charge threshold for the second thermal energy storage device.

A further preferred embodiment of the energy management system according to the present invention is characterized in that the controller is configured such that, when the state of charge of the at least one second thermal energy storage device is at or below a predefined second (thermal energy storage device) booster lower limit state of charge threshold ($LL_{boost,SH}$), the controller starts a second charging operation, in which energy provided by the at least one heat pump and/or energy provided by the at least one renewable energy generation device is used at least for charging the second thermal energy storage device, only in the case that renewable energy (that can be) provided by the at least one renewable energy generation device is available and/or there is currently a predefined proactive period in which charging of the at least one thermal energy storage device should be carried out preferentially.

A further preferred embodiment of the energy management system according to the present invention is characterized in that the controller is configured such that,
during a first charging operation in which energy provided by (a heat pump operation of) the at least one heat pump and/or energy provided by the at least one renewable energy generation device is used only for charging the at least one first thermal energy storage device, the controller stops the first charging operation when the state of charge of the at least one first thermal energy storage device is at or above a predefined first (energy storage device) upper limit state of charge threshold ($UL_{DHW}$, $UL_{max,DHW}$), wherein, in times renewable energy (that can be) provided by the at least one renewable energy generation device is available, the predefined first (energy storage device) upper limit state of charge threshold is a maximum first (energy storage device) upper limit state of charge threshold ($UL_{max,DHW}$) and, in times renewable energy (that can be) provided by the at least one renewable energy generation device is not available, the predefined first (energy storage device) upper limit state of charge threshold is a first (energy storage device) upper limit state of charge threshold ($UL_{DHW}$) lower than the maximum first (energy storage device) upper limit state of charge threshold, and/or
during a second charging operation in which energy provided by (a heat pump operation of) the at least one heat pump and/or energy provided by the at least one renewable energy generation device is used at least partially for charging the at least one second thermal energy storage device, the controller stops the second charging operation when the state of charge of the second thermal energy storage device is at or above a predefined second (energy storage device) upper limit state of charge threshold ($UL_{SH}$, $UL_{max,SH}$), wherein, in times renewable energy (that can be) provided by the at least one renewable energy generation device is available, the predefined second (energy storage device) upper limit state of charge threshold is a maximum second (energy storage device) upper limit state of charge threshold ($UL_{max,SH}$) and, in times renewable energy (that can be) provided by the at least one renewable energy generation device is not available, the predefined second (energy storage device) upper limit state of charge threshold is a second (energy storage device) upper limit state of charge threshold ($UL_{SH}$) lower than the maximum second (energy storage device) upper limit state of charge threshold.

The predefined first upper limit state of charge threshold can also be designated as predefined first thermal energy storage device upper limit state of charge threshold or as predefined upper limit state of charge threshold for the first thermal energy storage device.

The predefined maximum first upper limit state of charge threshold can also be designated as predefined maximum first thermal energy storage device upper limit state of charge threshold or as predefined maximum upper limit state of charge threshold for the first thermal energy storage device.

The predefined second upper limit state of charge threshold can also be designated as predefined second thermal energy storage device upper limit state of charge threshold or as predefined upper limit state of charge threshold for the second thermal energy storage device.

The predefined maximum second upper limit state of charge threshold can also be designated as predefined maximum second thermal energy storage device upper limit state of charge threshold or as predefined maximum upper limit state of charge threshold for the second thermal energy storage device.

A further preferred embodiment of the energy management system according to the present invention is characterized in that the energy management system further comprises at least one space heating device for heating at least one space comprised by the building, wherein preferably the controller is configured to control the at least one space heating device to regulate the temperature of the a least one space.

Preferably, the at least one space heating device is selected from the group consisting of under floor heatings, wall heatings, fan coil units, and combinations thereof. Alternatively, the at least one space heating device can also be comprised of radiators and other means of heat emitting devices.

A further preferred embodiment of the energy management system according to the present invention is characterized in that the controller is configured such that, when the state of charge of the first thermal energy storage device is above a predefined first minimum lower limit state of charge threshold ($LL_{min,DHW}$) and (at the same time) the temperature of one or more spaces of the at least one space is below a predefined first lower limit temperature threshold ($T_{LL}$), the controller starts or maintains a heating operation in which energy provided by (a heat pump operation of) the at least one heat pump and/or energy provided by the at least one second thermal energy storage device is used at least partially by the at least one space heating device for heating the one or more spaces in which the temperature is below the predefined first lower limit temperature threshold (ILL), wherein preferably, when renewable energy (that can be) provided by the at least one renewable energy generation device is available, energy provided by (a heat pump operation of) the at least one heat pump, which uses energy provided by the at least one renewable energy generation device, is used for the heating operation.

A further preferred embodiment of the energy management system according to the present invention is characterized in that the controller is configured such that, when the temperature of the at least one space is at or above the predefined first lower limit temperature threshold ($T_{LL}$) and (at the same time) the temperature of one or more spaces of the at least one space is below a predefined second lower limit temperature threshold ($T_{LL,boost}$), which is higher than the predefined first lower limit temperature threshold ($T_{LL}$), the controller starts a heating operation in which energy provided by (a heat pump operation of) the at least one heat pump and/or energy provided by the at least one second thermal energy storage device is used at least partially by the at least one space heating device for heating the one or more spaces in which the temperature is below the predefined second lower limit temperature threshold ($T_{LL,boost}$) only in the case that renewable energy (that can be) provided by the at least one renewable energy generation device is available and/or in the case that there is currently a predefined proactive period in which charging of the at least one thermal energy storage device should be carried out preferentially.

A further preferred embodiment of the energy management system according to the present invention is characterized in that the energy management system comprises a state of charge monitoring device for monitoring the state of charge of the at least one first thermal energy storage device and/or the state of charge of the at least one second thermal energy storage device.

Preferably, the energy management system can comprise one or more of the following elements in addition to the at least one heat pump, the at least one first thermal energy storage device, the at least one second thermal energy storage device, the at least one renewable energy generation device, the at least one first state of charge analyser, the at least one second state of charge analyser, and the controller:

Connected devices:
  Space heating (SH) devices (e.g. under floor heating/walls, fan coil units FCU)
  DHW devices (bathtub, sink, appliances)
Inputs:
  External data
    Time-of-use electricity tariff (ToU) information
    Weather data (forecast or live)
  Immediate DHW demand
  Room temperature
  User settings, e.g. thermostat setpoint
  Heat pump status
Internal processing components:
  Control logic to maximise internal renewable energy consumption:
    Shift as much energy demand into times of renewables availability
    Avoid ToU price peaks
    Use thermal mass of the building as additional TES
    PV and ToU thresholds for system operation
    Boost temperature limits for TES charging during renewables availability
  Predictive components:
    DHW demand
    Space heating demand
      Thermal model of the building. Different predefined building types. Allows space heating prediction from weather forecast.
    Solar irradiance model
    Heat pump performance model
      Improved COP from weather forecast
      Deciding on best heat pump thermal energy receiver. Each energy receiver (e.g. direct heating from heat pump, charging SH-TES, charging DHW-TES) operates at different output temperature and temperature lift. Control evaluates best temperature lift for most efficient system operation at a given time.
    Weather forecasting/Live weather data
Outputs:
  System status/operating modes:
    Charge energy storage
    Discharge DHW from energy storage, but preheat mains water first in heat pump to conserve energy and smoothen heat pump operation
    Discharge DHW from energy storage
    Provide space heating from energy storage
    Provide space heating from heat pump Furthermore, the energy management device can comprise one or more of the following additional system elements:
  Electric energy storage (EES), e.g. lead, li-Ion, flow battery
  Household appliances connected to DHW, e.g. dishwasher, washing machine
  Other heat sources
    Waste water heat recovery
    Solar thermal collector
    District heating network According to a further preferred embodiment of the present invention, the controller is configured to use one or more or all of the following priority levels for operation:
1. If DHW-TES is below its lower state of charge limit then heat pump operation is prioritised to charge the DHW-TES
2. If there is a demand for space heating:
   a. Space heating is provided from heat pump if sufficient PV energy is available (above a defined minimum threshold for heat pump consumption)
   b. If PV output is available, below the defined minimum threshold for heat pump consumption, and the EES state of charge is above a defined minimum SOC level, space heating is provided from the heat pump.
   c. If neither a or b, space heating is provided from the SH-TES if sufficiently charged
   d. If neither a, b or c, space heating is provided from heat pump.
3. IF SH-TES is below its lower state of charge limit then the heat pump is operated to charge the SH TES
4. If PV energy is available and the EES has reached its maximum SOC level, but the heat pump is not currently operating according to any of the demand priority levels above, the heat pump is operated as follows:
   a. Charge DHW-TES to boosted SOC upper limit
   b. Charge SH-TES to boosted SOC upper limit
   c. Heat house to boosted set point temperature
5. If the time of day is within a pre-defined "proactive" charging period, the heat pump is operated as follows:
   a. Charge DHW-TES to boosted SOC upper limit
   b. Charge SH-TES to boosted SOC upper limit
   c. Heat house to boosted set point temperature Furthermore, the present invention relates to a method of using the energy management system according to the present invention.

The preferred embodiments of the energy management system described above also correspondingly apply to the method according to the present invention.

The present invention will be explained in more detail with reference to the following figures and examples without restricting it to the specific embodiments and parameters shown here.

Figure 1A:
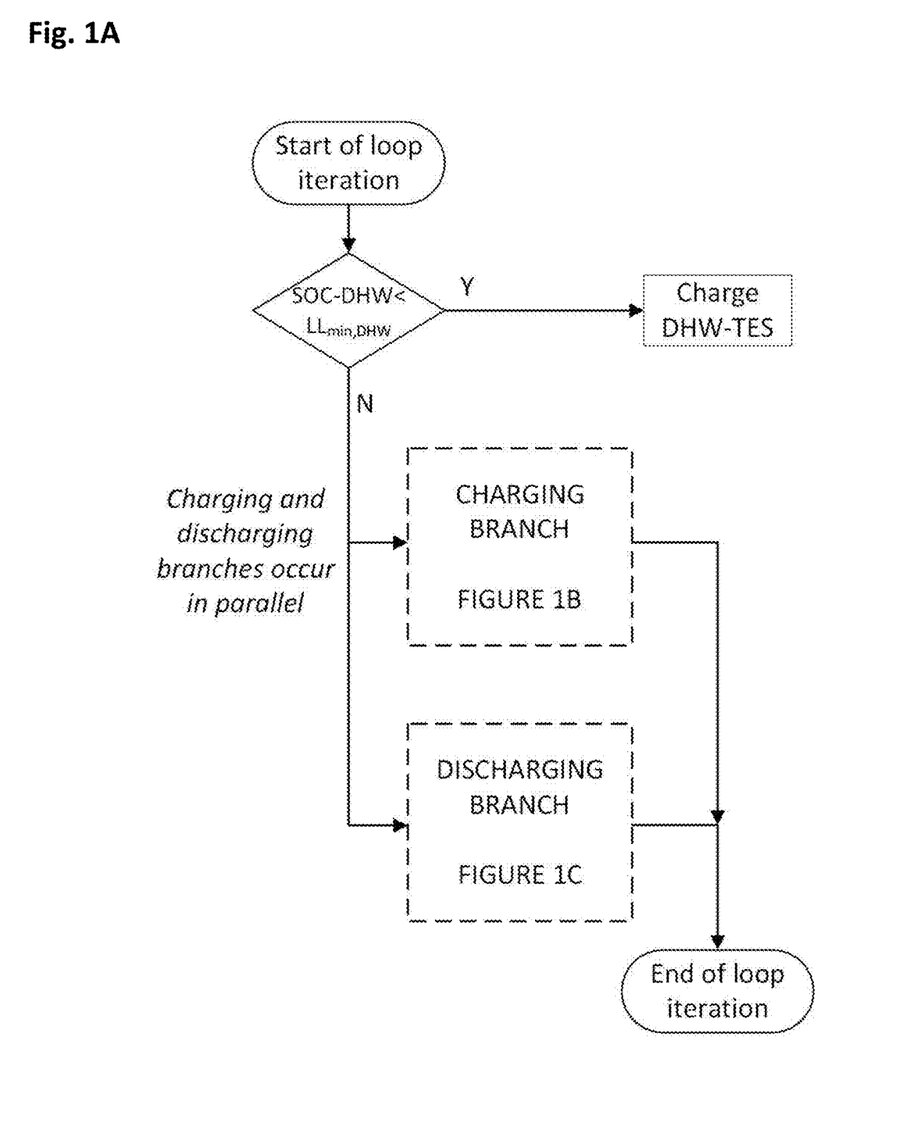
FIGS. 1A, 1B, and 1C show an overview of a single control loop iteration that can be used by a specific embodiment of the energy management system according to the present invention.
Figure 1B:
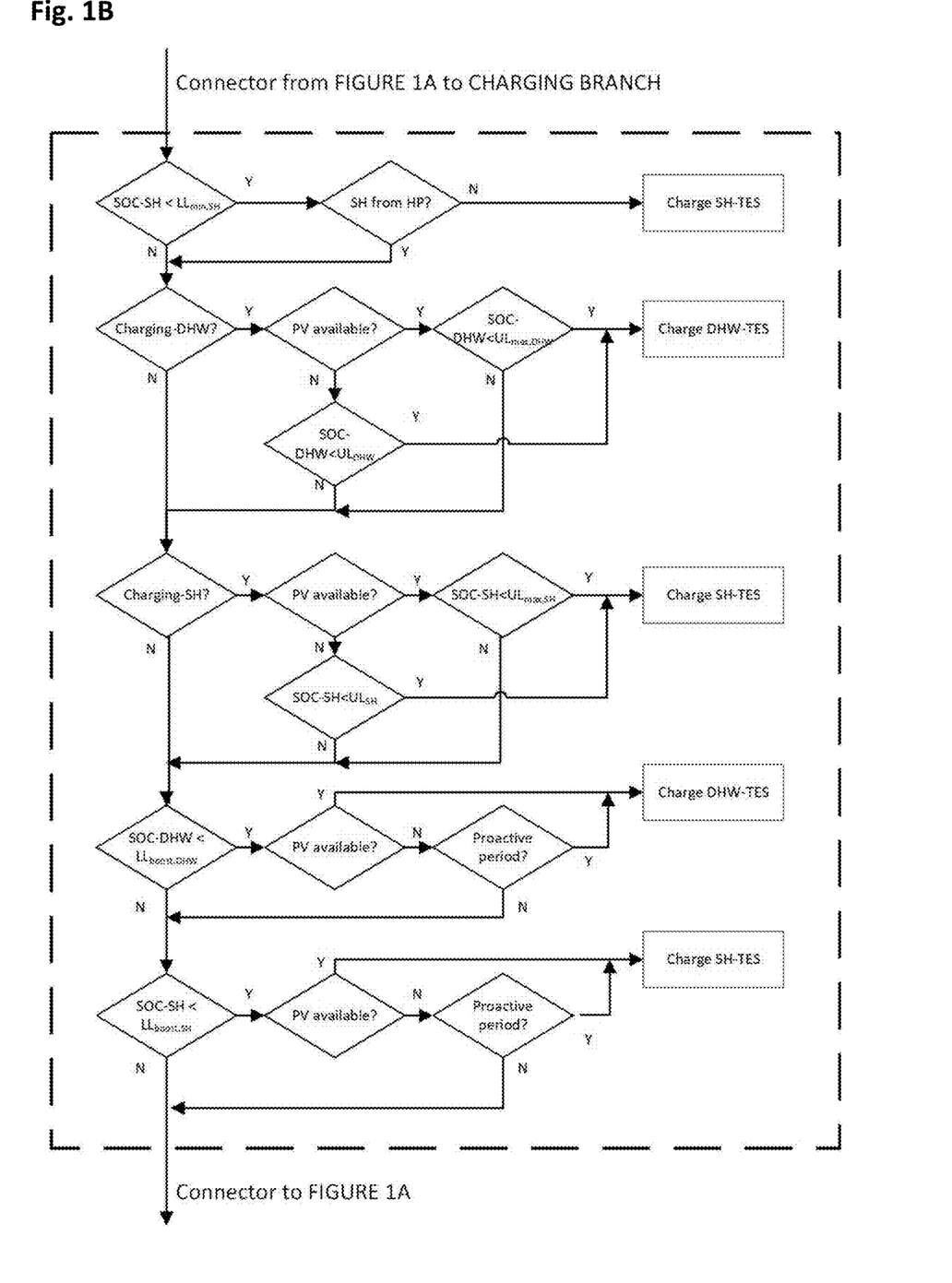
Figure 1C:
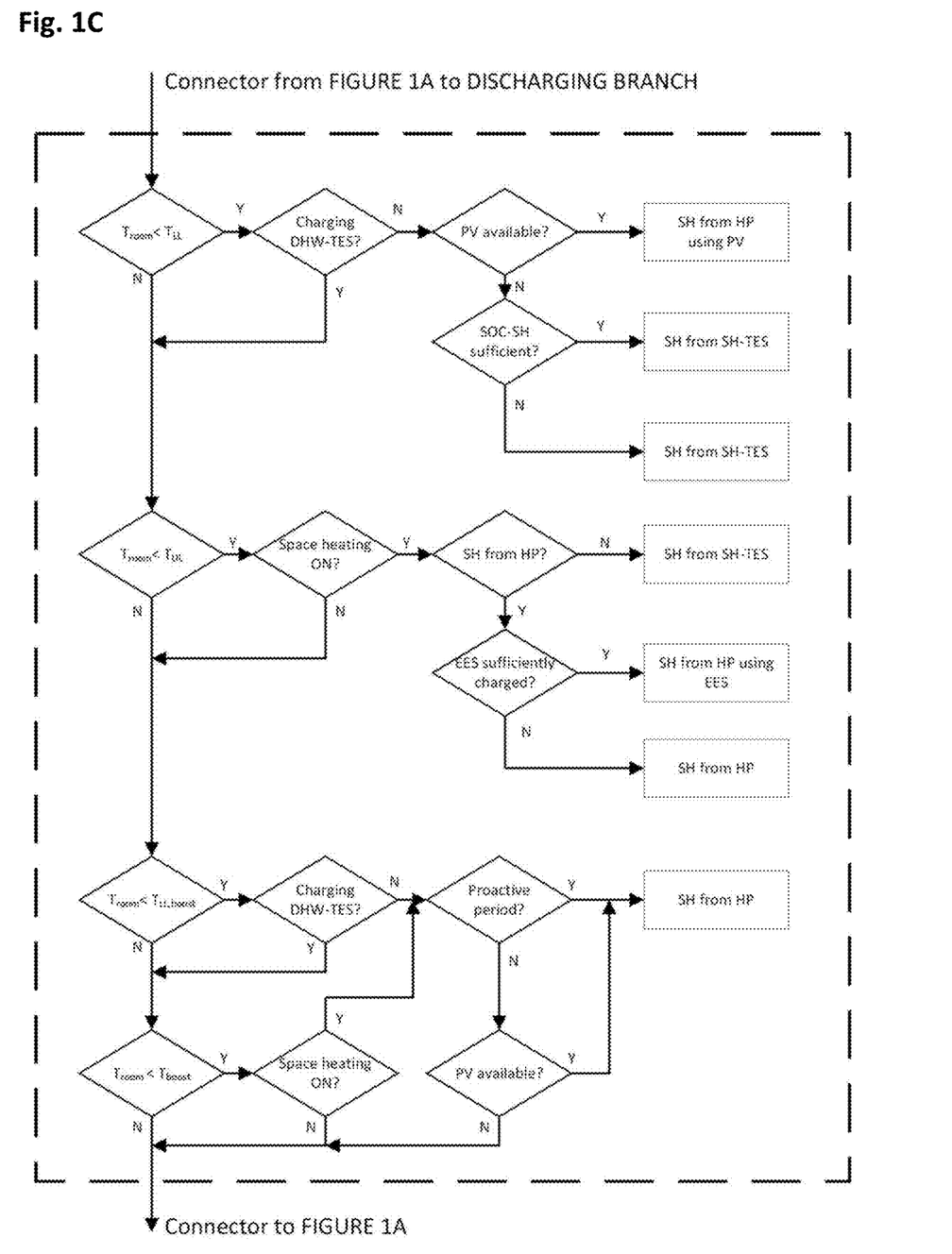

FIGS. 1A, 1B, and 1C show an overview of a single control loop iteration that can be used by a specific embodiment of the energy management system according to the present invention. This specific embodiment of the energy management system comprises a heat pump, a first thermal energy storage device for providing domestic hot water, a second thermal energy storage device for providing space heating, at least one renewable energy generation device, a first state of charge analyser for determining the state of charge of the first thermal energy storage device, a second state of charge analyser for determining the state of charge of the second thermal energy storage device, an optional electrical energy storage device, space heating devices for heating spaces comprised by the building, and a controller configured to control the heat pump, the first thermal energy storage device, the second thermal energy storage device, the at least one renewable energy generation device, the electrical energy storage device, and the space heating device. The at least one renewable generation device comprises a photovoltaic (PV) device and optionally and wind turbine.

The main overview of the single control loop iteration is illustrated in FIG. 1A. After start of loop iteration, the controller checks whether the state of charge of the thermal energy storage device for providing domestic hot water is below a predefined minimum lower limit state of charge threshold $LL_{min,DHW}$. If yes, the thermal energy storage device for providing domestic hot water is charged with energy provided by the heat pump. If no, the loop iteration continues on both a charging branch and a discharging branch in parallel until the end of loop iteration. The charging branch is shown in FIG. 1B while the discharging branch is illustrated in FIG. 1C.

Outline of the control system's priorities as shown in FIGS. 1A, 1B, and 1C:

1. DHW Priority

The system prioritises the provision of domestic hot water (DHW). However, the thermal output from the heat pump is usually insufficient to heat mains water directly. Thus, a DHW thermal energy storage (DHW-TES) device is used, which is maintained at a minimum state of charge level. The minimum state of charge level ensures that the user can discharge DHW at any time. Some appliances like dishwashers or washer-driers could be integrated into the control system to use excess renewable energy, but a well dimensioned EES can overcome this issue as it allows instant operation of appliances.

The controller monitors the state of charge of the DHW-TES at the start of each execution and initiates a DHW-TES charging cycle if the SOC drops below a threshold. The outlet temperature for DHW-TES charging is highest in the entire system and the heat pump cannot provide simultaneous space heating during this period. However, space heating can be provided from the SH-TES during DHW-TES charging.

2. Charging and Discharging are Split into Two Separate Decision Branches:

On the charging branch, the control system monitors the SH-TES state of charge as second priority to maintain a minimum level as well. Then, it continues charging either DHW-TES or SH-TES, when a charging cycle was initiated previously and the system has not reached its upper state of charge threshold yet.

On the discharging branch, lower and upper deadband thresholds are defined for the room temperature. Space heating is initiated, if the room temperature falls below the lower deadband limit. The system operates in different modes to either supply the heat emitters with energy directly from the heat pump or the energy storage.

3. Self-Consumption

The control increases renewable energy consumption by raising the thresholds, when renewable energy is available to boost the capacities of the TES. If all TES are fully charged to the maximum outlet temperature of the heat pump, a booster can be used to charge them further. In addition, the building's thermal mass can be used as additional TES by increasing the upper limit of the space heating deadband.

4. Proactive Times

Proactive system operation times can have different purposes and can be combined with predictive tools. They can either be used to charge the TES to high state of charge levels, if high demand for either DHW or SH is predicted. Another application can be to avoid price peaks for time-of-use electricity tariffs.

5. Electric Energy Storage EES

Excess renewables energy can be stored in an optional EES and is later accessible by appliances and the heat pump for space heating or charging the DHW-TES. Charging the EES is not shown in FIG. 1, because renewables output often exceeds the heat pump's electricity demand. In FIG. 1 it is assumed that by default any excess renewables energy is used to charge the EES, which will often occur in parallel to heat pump operation.

Furthermore, different system operating modes are defined, which can include:

- Charging of SH and DHW-TES from either at least one heat pump or a solar collector. In larger buildings it is possible that each of the TES is connected to a separate heat pump to allow simultaneous charging of different TES.
- Charging electric storage if excess renewable energy is available. However, the specific example of the invention shown in FIG. 1 prioritises thermal use of the renewable energy.
- Operating the heat pump from electric energy storage to charge the DHW-TES or provide space heating from the heat pump to cover thermal demand, if no renewable energy is available. The electricity source for the heat pump can be the national grid, local area microgrid, the renewables system, or the electric energy storage.
- Discharge DHW mode is manually initiated by the user and cannot be controlled directly, but DHW is supplied by the system and the system needs to react to it
- Space heating can either be provided from the heat pump or the space heating TES. Additional space heating operation modes can arise, if there are different temperature zones or different types of heat emitters in the building.

For the integration of a state of charge monitoring system, several thresholds are defined:

- SOC monitoring applied to DHW-TES and SH-TES. Once the SOC drops below a lower limit threshold charging is activated until the SOC reaches an upper limit threshold:
  - Charging start conditions or lower limit SOC thresholds ($LL_{min,DHW}$, $LL_{min,SH}$, $LL_{boost,DHW}$, $LL_{boost,SH}$) corresponding to different times or situations during the day Charging end conditions or upper limit SOC thresholds ($UL_{DHW}$, $UL_{SH}$, $UL_{max,DHW}$, $UL_{max,SH}$) at different times during the day.

Minimum renewable energy generation threshold depicted as "PV available" in FIG. 1. During periods of renewables generation start and conditions for heat pump operation are adjusted to shift energy demand into times of renewable energy availability. The threshold can be based on:

Integration of weather data to forecast best charging times
Integration of solar irradiance model. The solar irradiance model uses the roof tilt, angle and location of the building to convert the weather forecast into PV output.
Power output from PV in watt
Fixed value throughout the year
Variable threshold depending on solar irradiance and season Wind generation prediction from weather data and threshold if a wind turbine is installed on-site or shared between the local community. In many countries this can also be used to anticipate low ToU prices from weather data, where electricity price is related to carbon intensity of the overall generation mix.

Space heating upper and lower limits
Variable throughout the day to adapt it to different comfort levels and to use building's thermal mass as additional thermal energy storage. Upper limit is increased when excess renewable energy is available to consume renewables electricity in heat pump and store the resulting heat output in thermal mass of the building.

Proactive charging for scheduled events:
Prior to anticipated DHW peak
Before ToU tariff price peaks. ToU tariff prices are often published several hours in advance. Price peaks can be avoided by proactive charging to pre-empt heat pump operation into times of lower tariff prices.

Moreover, user settings are possible: Let the user set the priority level setting, e.g.:

"Battery" prioritise electric battery storage over SH-TES to charge EES first.
"Boost" allows the system to boost room temperature when EES and SH-TES are fully charged, but renewables energy is available. A resistance heater can also be used to boost temperature of SH-TES and DHW-TES beyond maximum heat pump output temperature.

Figure 2:
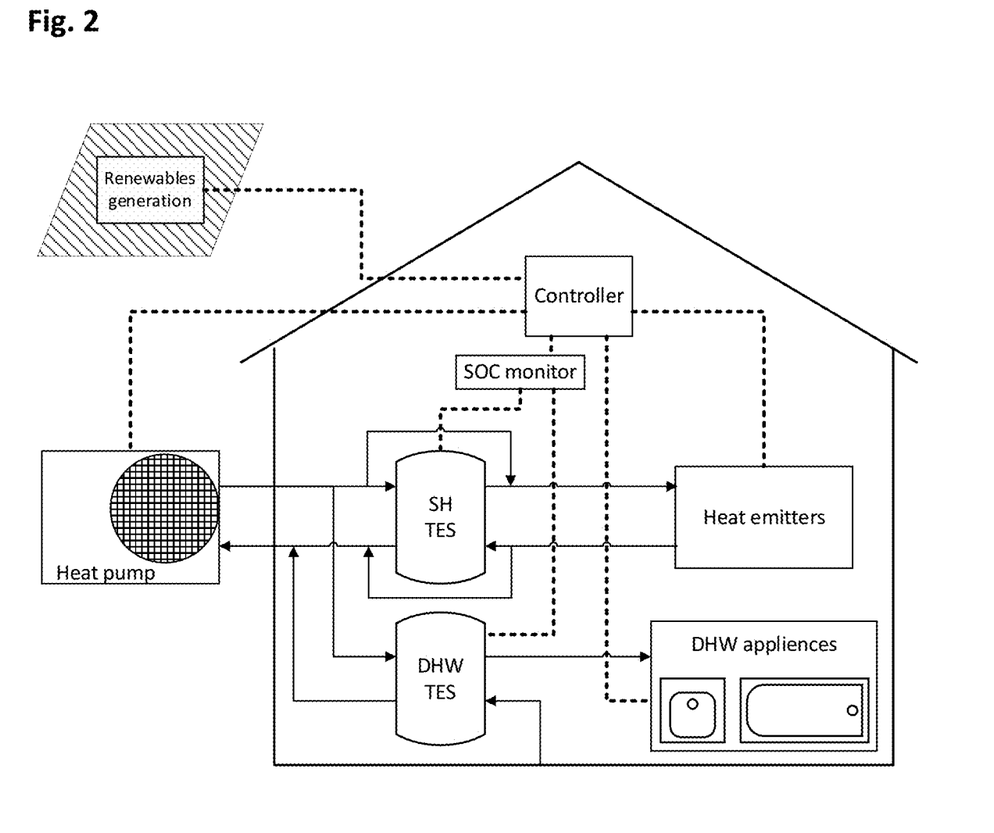
FIG. 2 shows a first example of a controller as a computational device.

The control logic can be integrated into a control device. The first example illustrated in FIG. 2 shows the controller as a computational device that is connected to all the buildings energy hardware including the heat pump, the renewable energy generation device, DHW-TES, SH-TES, SOC monitoring system/software and the appliances. In an alternative implementation, which is illustrated in FIG. 3, an EES can also be connected to the controller.

The controller exchanges data with the connected hardware and either controls the hardware directly or feeds settings into to the hardware's individual controllers, e.g. on/off and load signals.

Figure 3:
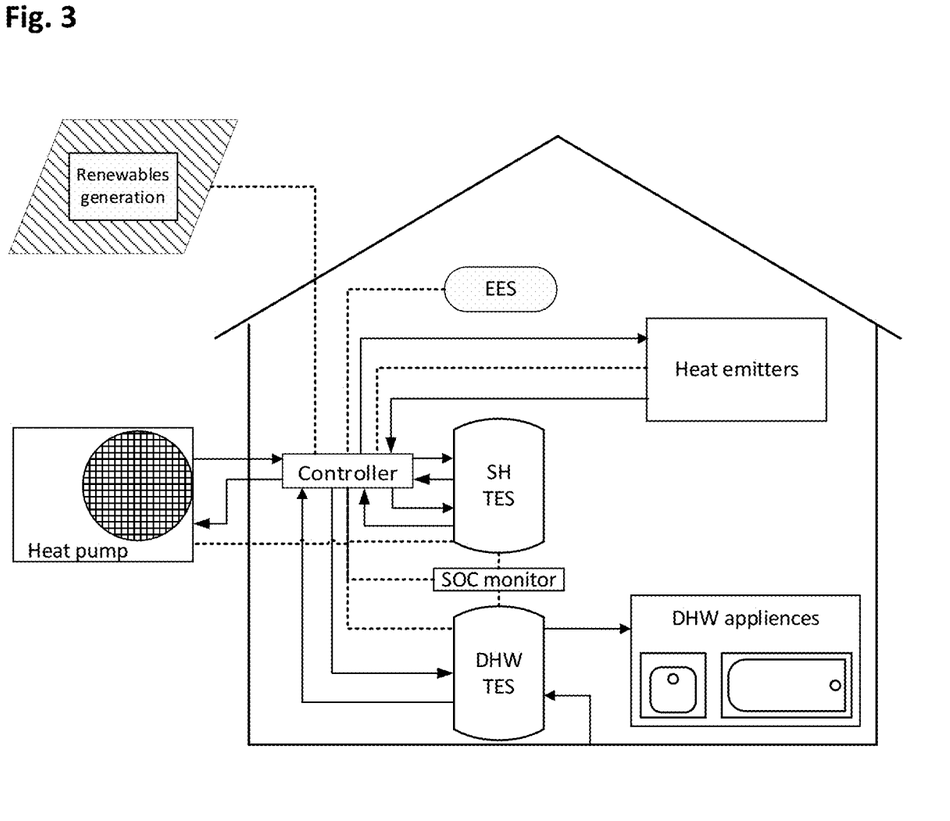
FIG. 3 shows a second example of a controller.

In the alternative implementation shown in FIG. 3, the controller features its own hardware components such as valves, pipework and instrumentation in addition to the data links to the connected devices. The battery is charged with any surplus renewable energy in FIG. 3, which is a common operating principle for renewable and EES systems. Whenever the renewables output exceeds the electricity consumption from the house, renewable energy is used to charge EES.

REFERENCE SIGNS AND ABBREVIATIONS

DHW Domestic hot water
DHW-TES Thermal energy storage for domestic hot water
EES Electrical energy storage
FCU Fan coil unit
HP Heat pump
$LL_{boost,DHW}$ First booster lower limit state of charge threshold (booster lower limit state of charge threshold of thermal energy storage for domestic hot water)
$LL_{boost,SH}$ Second booster lower limit state of charge threshold (booster lower limit state of charge threshold of thermal energy storage for space heating)
$LL_{min,DHW}$ First minimum lower limit state of charge threshold (lower limit state of charge threshold of thermal energy storage for domestic hot water to maintain minimum level)
$LL_{min,SH}$ Second minimum lower limit state of charge threshold (lower limit state of charge threshold of thermal energy storage for space heating to maintain minimum level)
N Decision result negative—"No"
PV Renewable energy source, e.g. photovoltaics
SH-TES Thermal energy storage for space heating
SOC State of charge
SOC-DHW State of charge—thermal energy storage for domestic hot water
SOC-SH State of charge—thermal energy storage for space heating
$T_{boost}$ Room temperature boost to use building's thermal mass as TES during PV availability
$T_{LL}$ First lower limit temperature threshold (lower limit room temperature deadband threshold)
$T_{LL,boost}$ Second lower limit temperature threshold (lower limit room temperature deadband to initiate room temperature boost)
$T_{room}$ Room temperature measured
$T_{set}$ Target room temperature setpoint, e.g. thermostat setpoint
$T_{UL}$ Upper limit room temperature deadband threshold
ToU Time-of-use electricity tariff
SH Space heating
TES Thermal energy storage
UL Upper limit state of charge threshold
$UL_{DHW}$ First upper limit state of charge threshold lower than $UL_{max,DHW}$ (upper limit state of charge threshold of thermal energy storage for domestic hot water)
$UL_{SH}$ Second upper limit state of charge threshold lower than $UL_{max,SH}$ (upper limit state of charge threshold of thermal energy storage for space heating)
$UL_{max}$ Upper limit state of charge threshold to boost SOC during PV availability
$UL_{max,DHW}$ Maximum first upper limit state of charge threshold (upper limit state of charge threshold of thermal energy storage for domestic hot water to boost SOC during PV availability)
$UL_{max,SH}$ Maximum second upper limit state of charge threshold (upper limit state of charge threshold of thermal energy storage for space heating to boost SOC during PV availability)
Y Decision result positive—"Yes"

The invention claimed is:

1. An energy management system for a building, comprising:
    at least one heat pump;
    at least one first thermal energy storage device for providing domestic hot water;
    at least one second thermal energy storage device for providing space heating;
    at least one renewable energy generation device;
    at least one first state of charge analyser for determining the state of charge of the at least one first thermal energy storage device;
    at least one second state of charge analyser for determining the state of charge of the at least one second thermal energy storage device; and
    a controller configured to control the at least one heat pump, the at least one first thermal energy storage device, the at least one second thermal energy storage device, and the at least one renewable energy generation device,
    wherein the controller is configured to control, in dependence on at least the state of charge of the at least one first thermal energy storage device and/or the state of charge of the at least one second thermal energy storage device, whether one of and which of the at least one first thermal energy storage device and the at least one second thermal energy storage device is charged with energy provided by the at least one heat pump and/or energy provided by the at least one renewable energy generation device, and
    the controller is configured such that, when the state of charge of the at least one first thermal energy storage device is at or above a predefined first minimum lower limit state of charge threshold ($LL_{min,DHW}$), the controller controls, whether one of and which of the at least one first thermal energy storage device and the at least one second thermal energy storage device is charged with energy provided by the at least one heat pump and/or energy provided by the at least one renewable energy generation device.

2. The energy management system according to claim 1, wherein the energy management system further comprises at least one electrical energy storage device, wherein preferably the controller is configured to control the at least one electrical energy storage device.

3. The energy management system according to claim 1, wherein the controller is configured to control, in dependence on the state of charge of the at least one first thermal energy storage device and/or the state of charge of the at least one second thermal energy storage device, and also in dependence on at least one selected from the group consisting of availability of renewable energy that can be provided by the at least one renewable energy generation device; time-of-use electricity tariff information; weather data, preferably forecast weather data, live weather data; domestic hot water demand, preferably immediate domestic hot water demand; temperature of one or more spaces to be heated; heat pump status; thermal model of the building; solar model; heat pump model; thermal energy storage model; user settings, preferably thermostat setpoints, thresholds, e.g. thermostat thresholds, set temperatures including boost temperatures, energy settings, e.g. thermostat energy settings; and combinations thereof, whether one of and which of the at least one first thermal energy storage device and the at least one second thermal energy storage device is charged with energy provided by the at least one heat pump and/or energy provided by the at least one renewable energy generation device.

4. The energy management system according to claim 1, wherein that the at least one renewable energy generation device is selected from the group consisting of solar generation devices, preferably photovoltaic cells, photovoltaic modules; wind turbines; water turbines; and combinations thereof.

5. The energy management system according to claim 1, wherein
    the at least one first thermal energy storage device for providing domestic hot water is selected from the group consisting of phase-change material storage devices, preferably phase-change material storage devices with a melting point of 40° C. to 70° C.; hot water tanks; and combinations thereof, and/or
    the at least one second thermal energy storage device for providing space heating is selected from the group consisting of phase-change material storage devices, preferably phase-change material storage devices with a melting point of 30° C. to 55° C.; buffer tanks, and combinations thereof.

6. The energy management system according to claim 1, wherein the controller is configured such that, when the state of charge of the at least one first thermal energy storage device is below the predefined first minimum lower limit state of charge threshold ($LL_{min,DHW}$), the controller starts or maintains a first charging operation in which energy provided by the at least one heat pump and/or energy provided by the at least one renewable energy generation device is used only for charging the at least one first thermal energy storage device.

7. The energy management system according to claim 6, wherein the controller is configured such that, when the state of charge of the at least one first thermal energy storage device is at or above the predefined first minimum lower limit state of charge threshold ($LL_{min,DHW}$), but below a predefined first booster lower limit state of charge threshold ($LL_{boost,DHW}$), the controller starts the first charging operation only in the case that renewable energy that can be provided by the at least one renewable energy generation device is available and/or in the case that there is currently a predefined proactive period in which charging of the at least one thermal energy storage device should be carried out preferentially.

8. The energy management system according to claim 1, wherein the controller is configured such that, when the state of charge of the at least one second thermal energy storage device is at or above a predefined second minimum lower limit state of charge threshold ($LL_{min,SH}$), but below a predefined second booster lower limit state of charge threshold ($LL_{boost,SH}$), the controller starts a second charging operation, in which energy provided by the at least one heat pump and/or energy provided by the at least one renewable energy generation device is used at least for charging the second thermal energy storage device, only in the case that renewable energy that can be provided by the at least one renewable energy generation device is available and/or there is currently a predefined proactive period in which charging of the at least one thermal energy storage device should be carried out preferentially.

9. The energy management system according to claim 1, wherein the controller is configured such that,
    during a first charging operation in which energy provided by the at least one heat pump and/or energy provided by the at least one renewable energy generation device is used only for charging the at least one first thermal energy storage device, the controller stops the first charging operation when the state of charge of the at least one first thermal energy storage device is at or above a predefined first upper limit state of charge threshold ($UL_{DHW}$, $UL_{max,DHW}$), wherein, in times renewable energy that can be provided by the at least one renewable energy generation device is available, the predefined first upper limit state of charge threshold is a maximum first upper limit state of charge threshold ($UL_{max,DHW}$) and, in times renewable energy that can be provided by the at least one renewable energy generation device is not available, the predefined first upper limit state of charge threshold is a first upper limit state of charge threshold ($UL_{DHW}$) lower than the maximum first upper limit state of charge threshold, and/or during a second charging operation in which energy provided by the at least one heat pump and/or energy provided by the at least one renewable energy generation device is used at least partially for charging the at least one second thermal energy storage device, the controller stops the second charging operation when the state of charge of the second thermal energy storage device is at or above a predefined second upper limit state of charge threshold ($UL_{SH}$, $UL_{max,SH}$), wherein, in times renewable energy that can be provided by the at least one renewable energy generation device is available, the predefined second upper limit state of charge threshold is a maximum second upper limit state of charge threshold ($UL_{max,SH}$) and, in times renewable energy that can be provided by the at least one renewable energy generation device is not available, the predefined second upper limit state of charge threshold is a second upper limit state of charge threshold ($UL_{SH}$) lower than the maximum second upper limit state of charge threshold.

10. The energy management system according to claim 1, wherein the energy management system further comprises at least one space heating device for heating at least one space comprised by the building, wherein preferably the controller is configured to control the at least one space heating device to regulate the temperature of the at least one space.

11. The energy management system according to claim 10, wherein the at least one space heating device is selected from the group consisting of under floor heatings, wall heatings, fan coil units, and combinations thereof.

12. The energy management system according to claim 10, wherein the controller is configured such that, when the state of charge of the first thermal energy storage device is above a predefined first minimum lower limit state of charge threshold ($LL_{min,DHW}$) and the temperature of one or more spaces of the at least one space is below a predefined first lower limit temperature threshold ($T_{LL}$), the controller starts or maintains a heating operation in which energy provided by the at least one heat pump or energy provided by the at least one second thermal energy storage device is used at least partially by the at least one space heating device for heating the one or more spaces in which the temperature is below the predefined first lower limit temperature threshold ($T_{LL}$), wherein preferably, when renewable energy that can be provided by the at least one renewable energy generation device is available, energy provided by the at least one heat pump, which uses energy provided by the at least one renewable energy generation device, is used for the heating operation.

13. The energy management system according to claim 12, wherein the controller is configured such that, when the temperature of the at least one space is at or above the predefined first lower limit temperature threshold ($T_{LL}$) and the temperature of one or more spaces of the at least one space is below a predefined second lower limit temperature threshold ($T_{LL,boost}$), which is higher than the predefined first lower limit temperature threshold ($T_{LL}$), the controller starts a heating operation in which energy provided by the at least one heat pump or energy provided by the at least one second thermal energy storage device is used at least partially by the at least one space heating device for heating the one or more spaces in which the temperature is below the predefined second lower limit temperature threshold ($T_{LL,\ boost}$) only in the case that renewable energy that can be provided by the at least one renewable energy generation device is available and/or in the case that there is currently a predefined proactive period in which charging of the at least one thermal energy storage device should be carried out preferentially.

14. A method of using an energy management system for a building according to claim 1.

* * * * *